United States Patent [19]

Löffler et al.

[11] 4,305,718
[45] Dec. 15, 1981

[54] DYEING AND PRINTING OF CELLULOSE-CONTAINING TEXTILE MATERIAL

[75] Inventors: Hermann Löffler, Speyer; Werner Juenemann, Bad Duerkheim; Gunther Lamm, Hassloch, all of Fed. Rep. of Germany

[73] Assignee: BASF Aktiengesellschaft, Rheinland-Pfalz, Fed. Rep. of Germany

[21] Appl. No.: 164,005

[22] Filed: Jun. 30, 1980

[30] Foreign Application Priority Data

Jul. 23, 1979 [DE] Fed. Rep. of Germany ....... 2929763

[51] Int. Cl.³ .............................................. D06P 3/82
[52] U.S. Cl. ................................. 8/532; 8/662; 8/690; 8/692; 8/695; 8/918; 260/156
[58] Field of Search ............... 8/532, 690, 692, 918, 8/695, 662

[56] References Cited

U.S. PATENT DOCUMENTS

| | | | |
|---|---|---|---|
| 3,706,525 | 12/1972 | Blackwell et al. | 8/532 |
| 3,905,951 | 9/1975 | Berrie et al. | 260/156 |
| 3,957,749 | 5/1976 | von Brachel et al. | 260/156 |
| 4,030,881 | 6/1977 | Boyd et al. | 8/531 |
| 4,134,723 | 1/1979 | Boyd et al. | 8/531 |
| 4,153,413 | 5/1979 | Bostock et al. | 8/532 |
| 4,169,705 | 10/1979 | Boyd et al. | 8/532 |
| 4,193,763 | 3/1980 | Cipolli et al. | 8/532 |
| 4,224,026 | 9/1980 | Reinhardt | 8/464 |

FOREIGN PATENT DOCUMENTS 2351157 12/1977 France .
1360749 7/1974 United Kingdom .
2011483 7/1979 United Kingdom .

Primary Examiner—A. Lionel Clingman
Attorney, Agent, or Firm—Oblon, Fisher, Spivak, McClelland & Maier

[57] ABSTRACT

A process for dyeing and printing cellulose-containing textile material, wherein the dye used is a compound of the general formula I

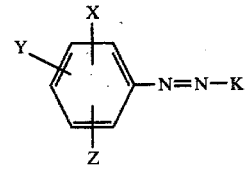

where
K is the radical of a coupling component of the pyridone, pyrazole or indole series,
one of the radicals X, Y and Z is a carboxylic acid ester group of a total of 2 to 19 carbon atoms, a carboxamide group of a total of 1 to 19 carbon atoms, an unsubstituted or substituted sulfonic acid phenyl ester group or a sulfonamide group of a total of 6 to 18 carbon atoms, and
the remaining substituents X, Y and Z are hydrogen, methyl, chlorine, bromine or nitro.

7 Claims, No Drawings

DYEING AND PRINTING OF CELLULOSE-CONTAINING TEXTILE MATERIAL

The present invention relates to a process for dyeing and printing cellulose-containing textile material, wherein the dye used is a compound of the general formula I

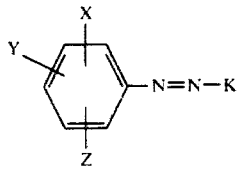

where
- K is the radical of a coupling component of the pyridone, pyrazole or indole series,
- one of the radicals X, Y and Z is a carboxylic acid ester group of a total of 2 to 19 carbon atoms, a carboxamide group of a total of 1 to 19 carbon atoms, an unsubstituted or substituted sulfonic acid phenyl ester group or a sulfonamide group of a total of 6 to 18 carbon atoms, and
- the remaining substituents X, Y and Z are hydrogen, methyl, chlorine, bromine or nitro.

The coupling component of the general formula KH preferably has the formula

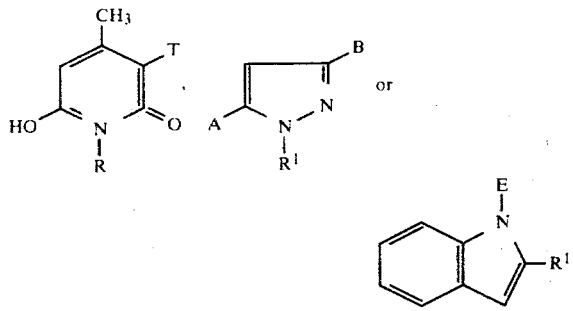

where
- R is hydrogen, $C_1$–$C_{10}$-alkyl, allyl, $C_1$–$C_4$-alkyl which is substituted by $C_1$–$C_4$-alkoxy, by phenoxy, by phenoxyethoxy or by phenyl (which is itself unsubstituted or substituted), $C_6$–$C_{12}$-polyalkoxyalkyl, phenyl, cyclohexyl or norbornyl,
- $R^1$ is phenyl which is unsubstituted or substituted by chlorine, by bromine, by $C_1$–$C_4$-alkyl or by $C_1$–$C_4$-alkoxy, or is methyl,
- A is amino or hydroxyl,
- B is methyl, a carboxylic acid ester group or unsubstituted or substituted carbamyl,
- E is hydrogen, methyl, ethyl, β-cyanoethyl, β-carbamylethyl or allyl and
- T is hydrogen, cyano, carbamyl or acetyl.

Examples of N-substituents of the carboxamide or sulfonamide groups of the diazo component are methyl, ethyl, propyl, butyl, n-hexyl, phenyl, benzyl, phenylethyl, 2-phenylpropyl, 2-ethylhexyl, 1,5-dimethylhexyl, n-octyl, n-dodecyl, n-tridecyl, 6-methylheptyl, 3-(2-ethyl-hexoxy)-propyl, stearyl, cyclohexyl, β-methoxyethyl, β-butoxyethyl, γ-methoxypropyl, γ-butoxypropyl or γ-ethoxypropyl; furthermore, the N-substituted carboxamide or sulfonamide can be the pyrrolidide, piperidide or morpholide.

Examples of O-substituents of sulfonic acid ester groups are phenyl, o-, m- and p-tolyl, o-, m- and p-chlorophenyl and 2,5-dichlorophenyl.

Examples of suitable carboxylic acid ester groups are: $COOCH_3$, $COOC_2H_5$, $COOC_3H_7$, $COOC_4H_9$-(n), $COO-CH_2-CH(CH_3)_2$, $COOC(CH_3)_3$, $COOC_4H_8Cl$, $COOC_5H_{11}$(n), $COOCH_2C(CH_3)_3$,

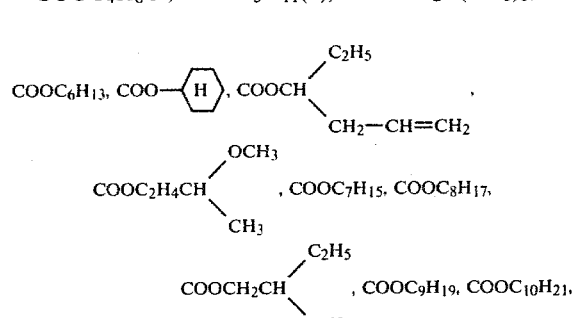

$COOC_{12}H_{25}$, $COOC_{16}H_{33}$, $COOC_{18}H_{37}$, $COOC_2H_4OC_2H_5$, $COOC_2H_4OC_4H_9$, $COOC_2H_4OC_6H_5$, $COOCH_2C_6H_5$, $COOC_2H_4C_6H_5$,

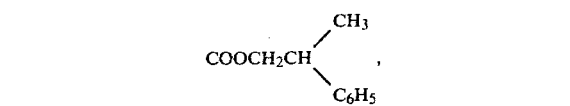

$COOC_2H_4OC_6H_5$, $COO(C_2H_4O)_2CH_3$, $COO(C_2H_4O)_2C_2H_5$, $COO(C_2H_4O)_2C_4H_9$, $COO(C_2H_4O)_3C_2H_5$ and $COO(C_2H_4O)_3C_4H_9$.

The carbamyl and carboxylic acid ester groups listed as possible substituents of the diazo component are also possible meanings of the radical B in the coupling component.

Specific examples of radicals R, in addition to those already mentioned, are:
$CH_3$, $C_2H_5$, $C_2H_4CN$, $C_3H_7$, $C_4H_9$, $CH_2CH(CH_3)_2$, $C_6H_{13}$,

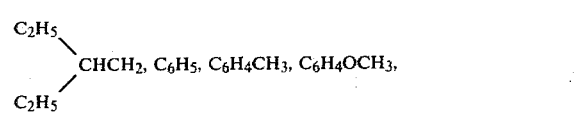

$C_2H_4OCH_3$, $C_2H_4OC_4H_9$, $C_3H_6OCH_3$, $C_3H_6OC_2H_5$, $C_3H_6OC_3H_7$, $C_3H_6OC_4H_9$, $C_3H_6OC_2H_4OC_6H_5$,

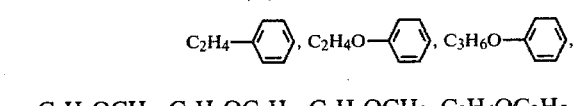

$C_3H_6OCH_2C_6H_5$ and $C_3H_6OC_2H_4C_6H_5$.

The dyes of the general formula I, to be used according to the invention, are obtained if an amine of the general formula III

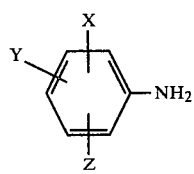

which is free from ionic groups is diazotized and coupled in a conventional manner with a component KH of the general formula II, X, Y, Z, R, $R^1$, A, B, E and T having the stated meanings.

Examples of suitable amines of the formula II are: the methyl, ethyl, n-butyl, i-butyl, n-hexyl, cyclohexyl, β-ethylhexyl, n-decyl, i-decyl, octadecyl, phenyl, 4'-tert.-butylphenyl, benzyl, phenylethyl, phenoxyethyl, β-ethoxy-ethyl, β-butoxy-ethyl, β-(β'-butoxy-ethoxy)-ethyl and γ-(γ'-methoxy-propoxy)-propyl esters of 2-aminobenzoic acid and of 4-aminobenzoic acid, and of the monohalo, dihalo, nitro and nitrohalo derivatives of these acids, eg. decyl 2-amino-3,5-dibromobenzoate, β-phenoxy-ethyl 2-amino-5-chloro-benzoate, decyl 2-amino-5-nitro-benzoate and decyl 2-amino-3-bromo-5-nitro-benzoate, as well as 2- and 4-aminobenzoic acid dimethylamide, diethylamide, iso-propylamide, di-n-butylamide, piperidide, morpholide, n-hexylamide, cyclohexylamide, ethylhexylamide, n- and i-decylamide, anilide, N-methylanilide, β-phenylethylamide and γ-(β'-phenoxy-ethoxy)-propylamide, as well as the corresponding amides of the monohalo, dihalo, nitro and nitrohalo derivatives of the acids, eg. 2-amino-3,5-dibromobenzoic acid β-ethylhexylamide, 2-amino-5-nitro-benzoic acid cyclohexylamide and 2-amino-3-bromo-5-nitro-benzoic acid β-ethylhexylamide.

Further suitable amides are 4-aminobenzenesulfonic acid 2-ethylhexyl-amide, tridecylamide, piperidide, β-phenylethyl-amide, 2-phenylpropyl-amide, n- and i-octylamide, 6-methylhept-2-ylamide, n-hexylamide, γ-(β-phenoxyethoxy)-propylamide, n-dodecylamide, diisooctylamide, 2-ethylhexoxy-propylamide, octadecylamide, anilide, toluidide, N-methylanilide, N-ethylanilide, N-ethylcyclohexylamide, N-methylcyclohexylamide, cyclohexylamide, β-cyclohexylethylamide, benzylamide, di-n-butylamide and dibenzylamide, and the corresponding compounds derived from 4-amino-3-chloro-, -3-bromo-, -3,5-dichloro- and -3,5-dibromo-benzenesulfonic acid; 4-aminobenzoic acid tridecylamide, 2-phenylpropyl-amide, n- and i-octylamide, n-dodecylamide, diisooctylamide, 2-ethylhexoxy-propylamide, octadecylamide, N-ethylcyclohexylamide, N-methylcyclohexylamide, β-cyclohexylethylamide and benzylamide, and the corresponding amides of 4-amino-3-chloro-, -3-bromo-, -3,5-dichloro- and -3,5-dibromo-benzoic acid; phenyl, tolyl, chlorophenyl and 2,5-dichlorophenyl 2-aminobenzenesulfonate; 2-aminobenzenesulfonic acid N-methylanilide, N-ethylanilide, N-methylcyclohexylamide, N-ethylcyclohexylamide, di-n-butylamide, dibenzylamide and di-(2-ethylhexyl)-amide, and the corresponding esters and amides of the monohalo, dihalo, nitro and nitrohalo derivatives of 2-aminobenzenesulfonic acid, eg. 2-amino-5-nitro-benzenesulfonic acid N-ethylanilide, phenyl 2-amino-3,5-dibromobenzenesulfonate, phenyl 2-amino-5-nitrobenzenesulfonate, phenyl 2-amino-3-bromo-5-nitrobenzenesulfonate and 2-amino-3,5-dibromobenzenesulfonic acid N-methylanilide; phenyl 4-aminobenzenesulfonate, phenyl 4-amino-3,5-dibromobenzenesulfonate and tolyl 4-aminobenzenesulfonate; 4-amino-2,5-dichlorobenzenesulfonic acid 2-ethylhexoxy-propylamide, 2-phenylethylamide, 2-phenoxy-ethoxy-propylamide, n-octylamide and 2-ethylhexyl-amide.

Preferred dyes for use in the process according to the invention are those of the formula

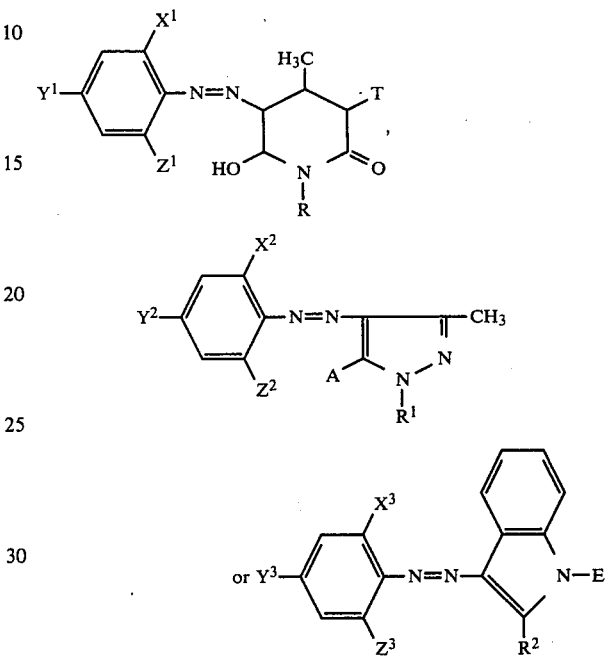

where A, E, R, $R^1$ and T have the stated meanings and $R^2$ is methyl or phenyl, and where one of $X^1$ and $Y^1$, one of $X^2$ and $Y^2$, and one of $X^3$ and $Y^3$ is a carboxylic acid ester group or carboxamide group of a total of 2 to 13 carbon atoms, or a sulfonamide group or unsubstituted or substituted sulfonic acid phenyl ester group of a total of 6 to 18 carbon atoms, and of the remaining substituents, either $X^1$ or $Y^1$, and $Z^1$, are hydrogen, either $X^2$ or $Y^2$, and $Z^2$, are hydrogen, chlorine or bromine and either $X^3$ or $Y^3$, and $Z^3$, are hydrogen, chlorine, bromine or nitro.

Suitable processes for applying the dyes of the formula I are, in particular, those described in German Pat. No. 1,811,796, German Laid-Open Applications DOS No. 2,524,243 and DOS No. 2,528,743 and German patent application No. P 2,855,188.4. Details of the methods of application may be found in the Examples, where parts and percentages are by weight, unless stated otherwise.

EXAMPLE 1

A fabric comprising 65 parts of polyester fibers and 35 parts of mercerized cotton is impregnated with a liquor which contains 80 g/l of a 20% strength aqueous formulation of a water-insoluble yellow disperse dye of the formula

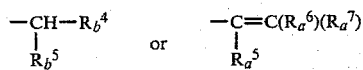 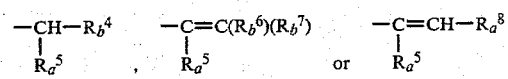

in which
$R_b^4$ is aryl, aralkyl, arylthioalkyl or a heterocyclic group,
$R_b^5$ is carboxy or its derivative, or alkyl having carboxy or its derivative,
$R_a^6$ is alkyl, haloalkyl, arylthio or heterocyclic-thioalkyl,
$R_a^7$ is hydrogen, haloalkyl or heterocyclic-thioalkyl and
$R_a^5$ is as defined above.

in which
$R_b^4$ is phenyl bearing N-substituted or unsubstituted alkanesulfonamido, or aroylalkoxy, naphthyl, aralkyl, arylthioalkyl or a heterocyclic group, and
$R_a^5$, $R_b^6$, $R_b^7$ and $R_a^8$ are each as defined before.

(4) Process 4

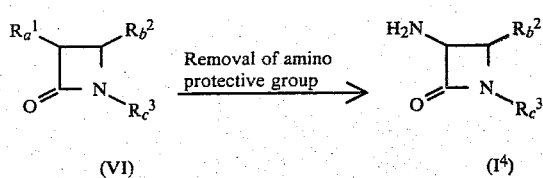

(6) Process 6

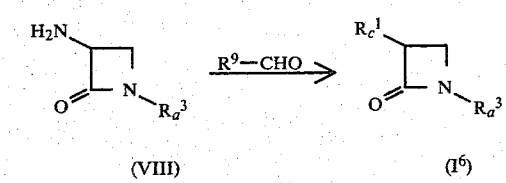

wherein
$R_a^1$ is protected amino,
$R_c^3$ is a group of the formula:

$$-CH-R_b^4 \quad -C=C(R_b^6)(R_b^7) \quad \text{or} \quad -C=CH-R_a^8$$
$$\quad | \qquad\qquad | \qquad\qquad\qquad\qquad\quad |$$
$$\quad R_a^5 \qquad\quad R_a^5 \qquad\qquad\qquad\qquad R_a^5$$

in which
$R_b^6$ is alkyl, haloalkyl or heterocyclic-thioalkyl,
$R_b^7$ is haloalkyl or heterocyclic-thioalkyl,
$R_a^8$ is arylthio and
$R_b^4$ and $R_a^5$ are each as defined before, and
$R_b^2$ is as defined before,
provided that, when $R_b^2$ is hydrogen,
$R_c^3$ is a group of the formula:

$$-CH-R_b^4 \quad -C=C(R_b^6)(R_b^7) \quad \text{or} \quad -C=CH-R_a^8$$
$$\quad | \qquad\qquad | \qquad\qquad\qquad\qquad\quad |$$
$$\quad R_a^5 \qquad\quad R_a^5 \qquad\qquad\qquad\qquad R_a^5$$

wherein
$R_b^4$ is phenyl bearing N-substituted or unsubstituted alkanesulfonamido, or aroylalkoxy, naphthyl, aralkyl, arylthioalkyl or a heterocyclic group, and
$R_a^5$, $R_b^6$, $R_b^7$ and $R_a^8$ are each as defined before.

(5) Process 5

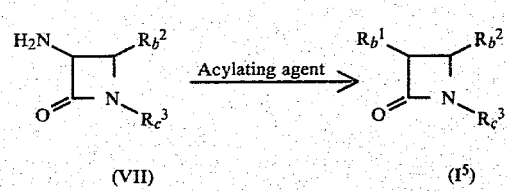

wherein
$R_b^1$ is acylamino, and
$R_b^2$ and $R_c^3$ are each as defined before.
provided that, when $R_b^2$ is hydrogen, $R_c^3$ is a group of the formula:

wherein
$R_c^1$ is dialkylamino-methyleneamino or aralkylidene amino,
$R^9$ is dialkylamino or aryl and
$R_a^3$ is as defined before.

(7) Process 7

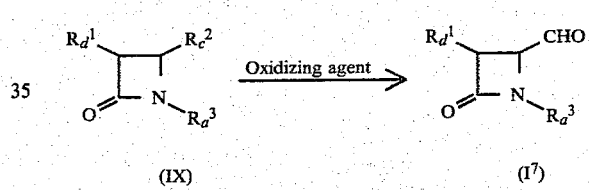

wherein
$R_d^1$ is acylamino or azido,
$R_c^2$ is a group of the formula:

$$-CH=CH-R^{10}$$

in which $R^{10}$ is aryl and
$R_a^3$ is as defined before.

(8) Process 8

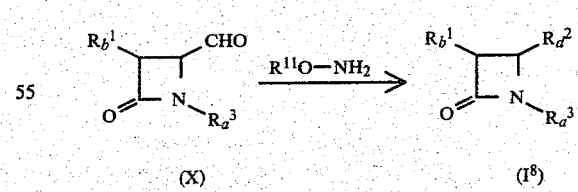

wherein
$R^{11}$ is aralkyl,
$R_b^2$ is a group of the formula:

$$-CH=N-OR^{11}$$

in which $R^{11}$ is as defined above, and
$R_b^1$ and $R_a^3$ are each as defined before.

(9) Process 9

$$\text{(XI)} \quad \xrightarrow{\text{Reduction}} \quad \text{(I}^9\text{)}$$

[Structure: β-lactam with N$_3$ and CHO groups at positions, N-R$_a^3$] → [β-lactam with N$_3$ and CH$_2$OH groups, N-R$_a^3$]

wherein R$_a^3$ is as defined before.

(10) Process 10

$$\text{(XII)} \quad \xrightarrow{\text{Oxidizing agent}} \quad \text{(I}^{10}\text{)}$$

[Structure: β-lactam with R$_b^1$ and CHO, N-R$_a^3$] → [β-lactam with R$_b^1$ and COOH, N-R$_a^3$]

wherein R$_b^1$ and R$_a^3$ are each as defined before.

(11) Process 11

$$R_e^1 - \underset{\underset{COOH}{|}}{CH}CH_2NH - R_c^3 \quad \xrightarrow{\text{Cyclization}} \quad \text{(I}^{11}\text{)}$$

(XIII)

wherein
R$_e^1$ is aralkylamino, azido or halogen and
R$_c^3$ is as defined above.

(12) Process 12

$$\text{(XIV)} \quad \xrightarrow{\substack{\text{Removal of amino,} \\ \text{hydroxy and/or carboxy} \\ \text{protective group}}} \quad \text{(I}^{12}\text{)}$$

[β-lactam with R$_f^1$, N-R$_d^3$] → [β-lactam with R$_g^1$, N-R$_d^3$]

wherein
R$_f^1$ is a acylamino having at least one functional group selected from protected amino, protected hydroxy and protected carboxy,
R$_g^1$ is acylamino having at least one functional group selected from amino, hydroxy and carboxy, and
R$_d^3$ is a group of the formula:

$$-\underset{\underset{R_a^5}{|}}{CH}-R_c^4 \quad , \quad -\underset{\underset{R_a^5}{|}}{C}=C(R_b^6)(R_b^7) \quad \text{or} \quad -\underset{\underset{R_a^5}{|}}{C}=CH-R_a^8$$

in which
R$_c^4$ is phenyl bearing N-substituted or unsubstituted alkanesulfonamido, or aroylalkoxy, naphthyl, aralkyl, arylthioalkyl or a heterocyclic group, and
R$_a^5$, R$_b^6$, R$_b^7$ and R$_a^8$ are each as defined above.

(13) Process 13

$$\text{(XV)} \quad \xrightarrow{\substack{\text{Removal of carboxy} \\ \text{protective group}}} \quad \text{(I}^{13}\text{)}$$

[β-lactam with R$^1$, R$_b^2$, N-R$_e^3$] → [β-lactam with R$^1$, R$_b^2$, N-R$_f^3$]

wherein R$_e^3$ is a group of the formula:

$$-\underset{\underset{R_c^5}{|}}{CH}-R_b^4 \quad , \quad -\underset{\underset{R_c^5}{|}}{C}=C(R_b^6)(R_b^7) \quad \text{or} \quad -\underset{\underset{R_c^5}{|}}{C}=CH-R_a^8$$

in which
R$_c^5$ is esterified carboxy, and R$_b^4$, R$_b^6$, R$_b^7$ and R$_a^8$ are each as defined before,
R$_f^3$ is a group of the formula:

$$-\underset{\underset{COOM}{|}}{CH}-R_b^4 \quad , \quad -\underset{\underset{COOM}{|}}{C}=C(R_b^6)(R_b^7) \quad \text{or} \quad -\underset{\underset{COOM}{|}}{C}=CH-R_a^8$$

in which M is hydrogen, or organic or inorganic cation, and R$_b^4$, R$_b^6$, R$_b^7$ and R$_a^8$ are each as defined before, provided that, when R$_b^2$ is hydrogen, R$_e^3$ is a group of the formula:

$$-\underset{\underset{R_c^5}{|}}{CH}-R_b^4 \quad , \quad -\underset{\underset{R_c^5}{|}}{C}=C(R_b^6)(R_b^7) \quad \text{or} \quad -\underset{\underset{R_c^5}{|}}{C}=CH-R_a^8$$

in which
R$_b^4$ is phenyl bearing N-substituted or unsubstituted alkanesulfonamido, or aroylalkoxy, and
R$_c^5$, R$_b^6$, R$_b^7$ and R$_a^8$ are each as defined before, and
R$_f^3$ is a group of the formula:

$$-\underset{\underset{COOM}{|}}{CH}-R_b^4 \quad , \quad -\underset{\underset{COOM}{|}}{C}=C(R_b^6)(R_b^7) \quad \text{or} \quad -\underset{\underset{COOM}{|}}{C}=CH-R_a^8$$

in which
R$_b^4$ is phenyl bearing N-substituted or unsubstituted alkanesulfonamido, or aroylalkoxy, and
R$_b^6$, R$_b^7$, R$_a^8$ and M are each as defined before.

(14) Process 14

$$\text{(XVI)} \quad \xrightarrow{\substack{\text{Removal of amino,} \\ \text{hydroxy and/or carboxy} \\ \text{protective group}}} \quad \text{(I}^{14}\text{)}$$

[β-lactam with R$^1$, N-R$_g^3$] → [β-lactam with R$^1$, N-R$_h^3$]

wherein R$_g^3$ is a group of the formula:

$$-\underset{\underset{R_a^5}{|}}{CH}-R_d^4$$

in which R$_d^4$ is aralkyl having at least one functional group selected from protected amino, protected hydroxy and protected carboxy and -continued $$\underset{HO}{\overset{H_3C}{\underset{}{\bigg|}}}D-N=N-\underset{N}{\overset{T}{\bigg|}}=O$$
$$\phantom{HO}\underset{R}{N}$$

| Example | D | T | R | Hue on polyester/cotton |
|---|---|---|---|---|
| 13 | " | " | CH₂CH(C₂H₅)—C₄H₉ | greenish yellow |
| 14 | " | CONH₂ | CH₃ | greenish yellow |
| 15 | " | " | C₄H₉—(n) | greenish yellow |
| 16 | " | " | CH₂—CH(C₂H₅)—C₄H₉ | greenish yellow |
| 17 | " | " | H | greenish yellow |
| 18 | ⌬-CO₂—C₁₀H₂₁—(i) (o-methylbenzoate) | CN | C₄H₉—(n) | greenish yellow |
| 19 | " | " | CH₃ | greenish yellow |
| 20 | " | " | C₂H₄OCH₃ | greenish yellow |
| 21 | ⌬-CO₂(C₂H₄O)₂C₄H₉ (o-methylbenzoate) | " | C₄H₉—(n) | greenish yellow |
| 22 | " | " | C₆H₁₃—(n) | greenish yellow |
| 23 | ⌬-CO₂—CH₂—CH(C₂H₅)—C₄H₉ (o-methylbenzoate) | CN | C₄H₉—(n) | greenish yellow |
| 24 | " | " | C₆H₁₃—(n) | greenish yellow |
| 25 | " | CONH₂ | CH₃ | greenish yellow |
| 26 | " | COCH₃ | CH₃ | greenish yellow |
| 27 | ⌬-CO₂—C₁₈H₃₇ (o-methylbenzoate) | CN | H | greenish yellow |
| 28 | " | " | CH₃ | greenish yellow |
| 29 | " | CONH₂ | H | greenish yellow |
| 30 | " | CN | C₄H₉—(n) | greenish yellow |
| 31 | " | CONH₂ | C₄H₉—(n) | greenish yellow |
| 32 | " | COCH₃ | C₄H₉—(n) | greenish yellow |
| 33 | ⌬-CO₂—⌬ (o-methylphenyl benzoate) | CN | C₄H₉—(n) | greenish yellow |
| 34 | " | " | C₆H₁₃—(n) | greenish yellow |
| 35 | " | " | CH₂—CH(C₂H₅)—C₄H₉ | greenish yellow |
| 36 | " | " | ⌬ (phenyl) | greenish yellow |
| 37 | " | COCH₃ | CH₃ | greenish yellow |
| 38 | ⌬(Cl,Cl)-CO₂—CH₂—CH(C₂H₅)C₄H₉ | CN | H | greenish yellow |
| 39 | " | " | CH₃ | greenish yellow |
| 40 | " | CONH₂ | C₄H₉—(n) | greenish yellow |
| 41 | ⌬-CO₂—C₂H₄—⌬ (o-methylbenzoate, phenethyl) | CN | CH₃ | greenish yellow |
| 42 | " | " | C₄H₉—(n) | greenish yellow |
| 43 | " | " | C₆H₁₃—(n) | greenish yellow |
| 44 | " | " | C₂H₄OCH₃ | greenish yellow |

-continued

| Example | D | T | R | Hue on polyester/cotton |
|---|---|---|---|---|
| 45 | (n)-$H_{21}C_{10}$—$O_2C$—⟨phenyl⟩— | " | H | yellow |
| 46 | " | " | $CH_3$ | yellow |
| 47 | " | $CONH_2$ | $C_4H_9$—(n) | yellow |
| 48 | " | $COCH_3$ | $C_4H_9$—(n) | yellow |
| 49 | (n)-$H_{21}C_{10}$—$O_2C$—⟨3,5-dibromophenyl⟩— | $CONH_2$ | $C_4H_9$—(n) | yellow |
| 50 | " | $COCH_3$ | $CH_3$ | yellow |
| 51 | ⟨phenyl-$CO_2C_{10}H_{21}$—(n)⟩— | CN | $C_4H_9$—(n) | greenish yellow |
| 52 | ⟨phenyl-$CO_2C_{10}H_{21}$—(i)⟩— | CN | $C_4H_9$—(n) | greenish yellow |
| 53 | ⟨phenyl-$CO_2$—$C_2H_4$—O—phenyl⟩— | CN | $C_4H_9$—(n) | greenish yellow |
| 54 | " | " | $CH_2$—$\underset{\underset{C_2H_5}{\mid}}{CH}$—$C_4H_9$ | greenish yellow |
| 55 | " | " | $C_2H_4$—⟨phenyl⟩ | greenish yellow |
| 56 | " | " | $C_6H_{13}$—(n) | greenish yellow |
| 57 | ⟨phenyl-$CO_2C_2H_5$⟩— | " | $CH_2$—$\underset{\underset{C_2H_5}{\mid}}{CH}$—$C_4H_9$ | greenish yellow |
| 58 | " | " | $C_6H_{13}$—(n) | greenish yellow |
| 59 | $H_9C_4$—$\underset{\underset{C_2H_5}{\mid}}{CH}$—$CH_2$—$OC_2$—⟨phenyl⟩— | " | $CH_3$ | yellow |
| 60 | " | " | $C_4H_9$—(n) | yellow |
| 61 | " | " | $C_6H_{13}$—(n) | yellow |
| 62 | " | " | $CH_2$—$\underset{\underset{C_2H_5}{\mid}}{CH}$—$C_4H_9$ | yellow |
| 63 | " | $CONH_2$ | $C_4H_9$—(n) | yellow |
| 64 | $H_9C_4$—$\underset{\underset{C_2H_5}{\mid}}{CH}$—$CH_2$—$O_2C$—⟨3,5-dibromophenyl⟩— | CN | $C_4H_9$—(n) | yellow |
| 65 | " | $CONH_2$ | $C_4H_9$—(n) | yellow |
| 66 | " | CN | $CH_3$ | yellow |
| 67 | " | $CONH_2$ | $CH_3$ | yellow |
| 68 | ⟨phenyl-$\overset{O}{\underset{\|}{C}}$—$OC_{10}H_{21}$⟩— | CN | $CH_2CH=CH_2$ | yellow |
| 69 | $\underset{C_4H_9-(n)}{\overset{C_2H_5}{\diagdown}}$CH$CH_2NSO_2$—⟨phenyl⟩— $\underset{H}{}$ | " | $CH_2CH=CH_2$ | yellow |
| 70 | " | " | $C_2H_4C_6H_5$ | yellow |

-continued $$\text{structure: } D-N=N- \text{ on pyridone ring with } H_3C, T, =O, HO, N-R$$

| Example | D | T | R | Hue on polyester/cotton |
|---------|---|---|---|------------------------|
| 71 | n-Octyl-NHSO$_2$-C$_6$H$_4$- | " | C$_4$H$_9$—(n) | yellow |
| 72 | i-Octyl-NHSO$_2$-C$_6$H$_4$- | " | C$_4$H$_9$—(n) | yellow |
| 73 | " | H | C$_4$H$_9$—(n) | greenish yellow |
| 74 | n-C$_{13}$H$_{27}$-NHC(O)-C$_6$H$_4$- | CN | C$_4$H$_9$—(n) | yellow |
| 75 | " | CONH$_2$ | C$_4$H$_9$—(n) | yellow |
| 76 | " | CN | CH$_3$ | yellow |
| 77 | C$_6$H$_5$-C$_2$H$_4$-NHSO$_2$-C$_6$H$_4$- | " | C$_4$H$_9$—(n) | yellow |
| 78 | n-C$_{13}$H$_{27}$-NHC(O)-C$_6$H$_2$Br$_2$- | CONH$_2$ | CH$_3$ | yellow |
| 79 | " | CN | CH$_3$ | yellow |
| 80 | n-Octyl-NHC(O)-C$_6$H$_4$- | " | C$_4$H$_9$—(n) | yellow |
| 81 | O$_2$S-OC$_6$H$_5$ (o-tolyl) | " | CH$_2$CH(C$_2$H$_5$)(C$_4$H$_9$) | yellow |
| 82 | " | " | C$_2$H$_4$C$_6$H$_5$ | yellow |
| 83 | i-Octyl-NHC(O)-C$_6$H$_4$- | " | C$_4$H$_9$—(n) | yellow |
| 84 | " | H | C$_4$H$_9$—(n) | greenish yellow |
| 85 | O$_2$S-OC$_6$H$_5$ on Br$_2$-tolyl | CN | CH$_2$CH(C$_2$H$_5$)(C$_4$H$_9$—(n)) | yellow |
| 86 | " | " | C$_6$H$_{13}$—(n) | yellow |
| 87 | O$_2$S-N(CH$_3$)(C$_6$H$_5$) on tolyl | " | CH$_2$CH(C$_2$H$_5$)(C$_4$H$_9$—(n)) | yellow |
| 88 | C$_6$H$_5$-C$_2$H$_4$-NHC(O)-C$_6$H$_4$- | " | C$_4$H$_9$—(n) | yellow |
| 89 | " | H | C$_4$H$_9$—(n) | greenish yellow |
| 90 | n-C$_{13}$H$_{27}$-NHSO$_2$-C$_6$H$_4$- | CN | CH$_3$ | yellow |
| 91 | " | CONH$_2$ | CH$_3$ | yellow |
| 92 | n-C$_{13}$H$_{27}$-NHSO$_2$-C$_6$H$_4$- | COCH$_3$ | CH$_3$ | yellow |
| 93 | " | CN | C$_2$H$_5$ | yellow |
| 94 | " | H | C$_4$H$_9$ | greenish yellow |
| 95 | (CH$_3$)$_2$CH-C$_3$H$_6$CH(CH$_3$)-NHC(O)-C$_6$H$_4$- | CN | CH$_3$ | yellow |
| 96 | " | " | C$_4$H$_9$—(n) | yellow |

-continued

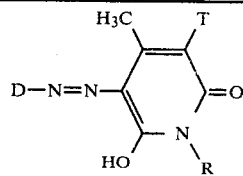

| Example | D | T | R | Hue on polyester/cotton |
|---|---|---|---|---|
| 97 | n-C₁₃H₂₇—NHSO₂—(3,5-Br₂-4-)C₆H₂— | " | CH₃ | yellow |

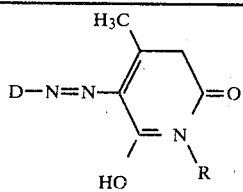

| Ex. | D | R | Hue on polyester/cotton |
|---|---|---|---|
| 98 | (n)-H₂₁C₁₀O₂C—C₆H₄— | C₄H₉—(n) | greenish yellow |
| 99 | " | CH₃ | " |
| 100 | " | C₆H₅— | " |
| 101 | " | C₆H₁₃—(n) | " |
| 102 | 2-(CO₂C₁₀H₂₁—(n))C₆H₄— | C₄H₉—(n) | " |
| 103 | " | CH₃ | " |

-continued

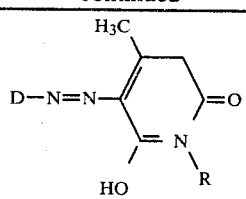

| Ex. | D | R | Hue on polyester/cotton |
|---|---|---|---|
| 104 | " | C₃H₆—OCH₃ | " |
| 105 | 2-(CO₂(C₂H₄O)₂C₄H₉)C₆H₄— | C₆H₁₃—(n) | " |
| 106 | " | C₆H₅— | " |
| 107 | 2-(CO₂C₁₈H₃₇)C₆H₄— | C₃H₆OCH₃ | " |

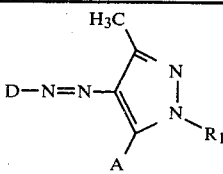

| Example | D | A | R₁ | Hue on polyester/cotton |
|---|---|---|---|---|
| 108 | 2-(CO₂C₁₀H₂₁—(n))C₆H₄— | NH₂ | C₂H₅ | yellow |
| 109 | " | " | 2-CH₃C₆H₄— | yellow |
| 110 | " | " | 4-OCH₃C₆H₄— | yellow |
| 111 | " | " | 2-BrC₆H₄— | yellow |
| 112 | 3,5-Br₂-2-(CO₂C₁₀H₂₁—(n))C₆H₂— | OH | (4-Br, 2-Cl)C₆H₃— | yellow |

-continued
| Example | D | A | R₁ | Hue on polyester/cotton |
|---|---|---|---|---|
| 113 | ″ | ″ |  | yellow |
| 114 | ″ | ″ | C₂H₅ 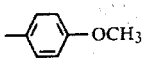 | yellow |
| 115 | ″ | ″ | —OCH₃ | yellow |
| 116 |  CO₂C₁₈H₃₇—(n) | ″ | Cl  | yellow |
| 117 | ″ | H₂N | 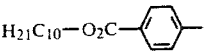 | yellow |
| 118 | H₂₁C₁₀—O₂C— | NH₂ | C₂H₅  | yellow |
| 119 | ″ | ″ | Br  | yellow |
| 120 | ″ | OH | Cl  | yellow |
| 121 | ″ | ″ |  | yellow |
| 122 | ″ | ″ | Br 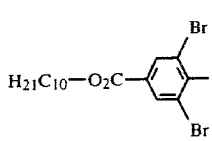 | yellow |
| 123 | H₂₁C₁₀—O₂C— (Br, Br) | ″ |  | yellow |
| 124 | ″ | ″ | C₂H₅  | yellow |
| 125 | ″ | ″ | Cl 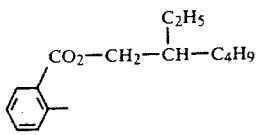 | yellow |
| 126 |  CO₂—CH₂—CH(C₂H₅)—C₄H₉ | H₂N | 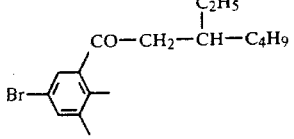 | yellow |
| 127 | 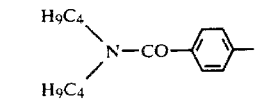 CO—CH₂—CH(C₂H₅)—C₄H₉ (Br, Br) | OH | ″ | yellow |
| 128 | (H₉C₄)(H₉C₄)N—CO— | H₂N | ″ | yellow |

-continued

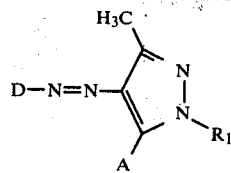

| Example | D | A | R₁ | Hue on polyester/cotton |
|---|---|---|---|---|
| 129 | 5-nitro-2-methyl-benzene with CO₂C₁₀H₂₁—(n) (O₂N-, CH₃-) | OH | " | golden yellow |
| 130 | " | " | 2,4-dichlorophenyl | yellow |
| 131 | C₈H₁₇(i)NHSO₂-phenyl-NO₂ (methyl) | " | 3-chlorophenyl | yellow |
| 132 | " | " | phenyl | yellow |
| 133 | C₆H₁₃(n)NH—SO₂-phenyl-NO₂ (methyl) | " | " | yellow |
| 134 | cyclohexyl-NHSO₂-phenyl-NO₂ (methyl) | " | " | yellow |
| 135 | C₈H₁₇(n)SO₂-phenyl-NO₂ (methyl) | " | " | yellow |
| 136 | 2-methylphenyl-O₂SO-phenyl (CH₃) | NH₂ | 2-ethylphenyl (C₂H₅) | yellow |
| 137 | CH₂—CHOC₃H₆—NHSO₂-(2,5-dichloro-methyl)phenyl with C₂H₅ and C₄H₉—(n) | " | C₆H₅ | yellow |
| 138 | n-C₁₃H₂₇NHSO₂-phenyl- | OH | " | yellow |
| 139 | C₆H₅—C₂H₄—NHSO₂-(2,5-dichloromethyl)phenyl | NH₂ | " | golden yellow |
| 140 | n-C₁₃H₂₇—NHC(O)-phenyl- | OH | " | yellow |
| 141 | C₆H₅OC₂H₄OC₃H₆NSO₂-(2,5-dichloromethyl)phenyl, H | NH₂ | " | golden yellow |
| 142 | n-C₁₃H₂₇—NHC(O)-(3,5-dibromo-methyl)phenyl | OH | " | yellow |

-continued

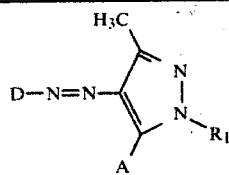

| Example | D | A | $R_1$ | Hue on polyester/cotton |
|---|---|---|---|---|
| 143 | n-Octyl-NH—SO$_2$—(2,5-diCl-phenyl)— | NH$_2$ | " | yellow |
| 144 | (C$_2$H$_5$)(C$_4$H$_9$-n)CH—CH$_2$NHC(O)—C$_6$H$_4$— | " | " | yellow |
| 145 | " | " | 3-C$_2$H$_5$—C$_6$H$_4$— | yellow |
| 146 | " | OH | " | yellow |
| 147 | " | " | 2,4-diCl—C$_6$H$_3$— | yellow |
| 148 | C$_6$H$_5$—C$_2$H$_4$—NHC(O)—C$_6$H$_4$— | " | C$_6$H$_5$ | yellow |
| 149 | i-Octyl-NH—C(O)—C$_6$H$_4$— | " | " | yellow |
| 150 | " | " | 2-C$_2$H$_5$—C$_6$H$_4$— | yellow |
| 151 | n-Octyl-NH—C(O)—C$_6$H$_4$— | " | " | yellow |
| 152 | " | " | C$_6$H$_5$ | yellow |
| 153 | n-Octyl-NH—SO$_2$—C$_6$H$_4$— | " | " | yellow |
| 154 | i-Octyl-NH—SO$_2$—C$_6$H$_4$— | " | " | yellow |

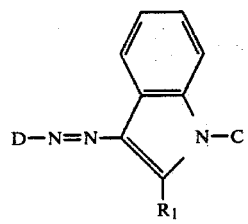

| Example | D | C | $R_1$ | Hue on polyester/cotton |
|---|---|---|---|---|
| 155 | (n)-H$_{21}$C$_{10}$—CO$_2$—C$_6$H$_4$— | H | C$_6$H$_5$— | brownish yellow |
| 156 | " | CH$_3$ | " | golden yellow |

-continued

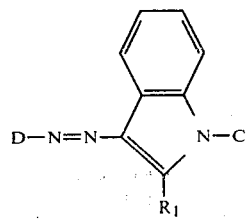

| Example | D | C | R₁ | Hue on polyester/cotton |
|---|---|---|---|---|
| 157 | CO₂CH₂—CH(C₂H₅)—C₄H₉—(n), 2,5-dibromo-substituted phenyl (Br, Br) | H | " | orange |
| 158 | 2-CO₂C₁₈H₃₇-phenyl | CH₃ | " | golden yellow |
| 159 | 2-methyl-5-nitro-phenyl with CO₂C₁₀H₂₁—(n) | H | " | yellowish brown |
| 160 | " | CH₃ | " | yellowish brown |
| 161 | 2-methyl-3-bromo-5-nitro-phenyl with CO₂C₁₀H₂₁—(n) | H | " | yellowish brown |
| 162 | " | CH₃ | " | yellowish brown |
| 163 | 2-methyl-5-nitro-phenyl with CO₂—C₂H₄—O—C₆H₅ | H | " | yellowish brown |
| 164 | " | CH₃ | " | yellowish brown |
| 165 | 2-methyl-3-bromo-5-nitro-phenyl with CO₂—C₂H₄—OCH₃ | H | " | yellowish brown |
| 166 | " | CH₃ | " | yellowish brown |
| 167 | 2-methyl-5-nitro-phenyl with CO₂—C₂H₄—OCH₃ | " | " | yellowish brown |
| 168 | " | C₂H₄CN | " | yellowish brown |
| 169 | 2-methyl-5-nitro-phenyl with CO₂—C₁₀H₂₁—(n) | " | " | yellowish brown |
| 170 | 2-methyl-3-bromo-5-nitro-phenyl with CO₂—C₁₀H₂₁—(n) | C₂H₄CONH₂ | " | yellowish brown |
| 171 | 3-nitrophenyl with CO₂—C₁₀H₂₁—(i) | H | " | yellowish brown |
| 172 | " | CH₃ | " | yellowish brown |
| 173 | 2-methylphenyl with O₂SOC₆H₅ | " | C₆H₅ | golden yellow |

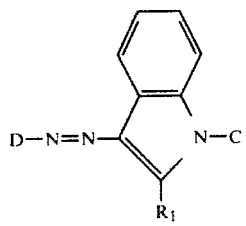

| Example | D | C | $R_1$ | Hue on polyester/cotton |
|---|---|---|---|---|
| 174 | (structure with $O_2SOC_6H_5$, Br, Br) | " | " | golden yellow |
| 175 | n-$C_{13}H_{27}$—NHCO—(Br, Br substituted phenyl) | " | " | golden yellow |
| 176 | n-$C_{13}H_{27}$—NHCO—(phenyl) | " | " | golden yellow |

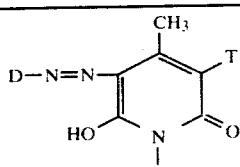

| Example | D | T | R | Hue on polyester/cotton |
|---|---|---|---|---|
| 177 | $CO_2C_{10}H_{21}$—(n) (ortho-methylphenyl) | CN | $C_{10}H_{21}$—(n) | greenish yellow |
| 178 | " | " | $C_{12}H_{25}$ | " |
| 179 | (n)-$H_{21}C_{10}CO_2$—(phenyl) | " | " | " |
| 180 | " | $CONH_2$ | " | " |
| 181 | " | CN | $C_9H_{19}$ / $C_{10}H_{21}$ / $C_{11}H_{23}$  1:1:1 | " |

We claim:

1. A process for dyeing and printing water-swellable cellulosic materials and blends thereof with synthetic materials in the presence of water and a solvent that is capable of maintaining cellulose in the swollen state, wherein the dye used is a compound of the general formula:

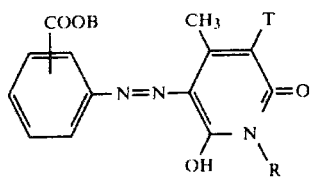

wherein

B is an alkyl group containing from 8 to 18 carbon atoms,

R is hydrogen or an alkyl group containing from 3 to 7 carbon atoms, and

T is hydrogen, cyano, carbamyl or acetyl.

2. The process of claim 1 wherein B contains 10 carbon atoms, R contains 4 carbon atoms and T is cyano.

3. The process of claim 1 wherein B contains 10 carbon atoms, R contains 4 carbon atoms and T is carbamyl.

4. The process of claim 1 wherein B contains 18 carbon atoms, R is hydrogen and T is cyano.

5. The process of claim 1 wherein B contains 18 carbon atoms, R contains 4 carbon atoms and T is cyano.

6. The process of claim 1 wherein B contains 10 carbon atoms, R contains 6 carbon atoms and T is cyano.

7. The process of claim 1 wherein B contains 18 carbon atoms, R contains 6 carbon atoms and T is cyano.

UNITED STATES PATENT AND TRADEMARK OFFICE
CERTIFICATE OF CORRECTION

PATENT NO. : 4,305,718

DATED : Dec. 15, 1981

INVENTOR(S) : Hermann Loffler, et. al.

It is certified that error appears in the above—identified patent and that said Letters Patent is hereby corrected as shown below:

On the title page, Inventors should read

[75] --- Inventors:  Hermann Loeffler, Speyer; Werner Juenemann, Bad Duerkheim; Gunther Lamm, Hassloch, all of Fed. Rep. of Germany --

Signed and Sealed this

Sixteenth Day of March 1982

[SEAL]

Attest:

GERALD J. MOSSINGHOFF

*Attesting Officer*  *Commissioner of Patents and Trademarks*